3,054,809
1-CYANO-ANDROSTANES
Albert Bowers and Howard J. Ringold, Mexico City, Mexico, assignors, by mesne assignments, to Syntex Corporation, a corporation of Panama
No Drawing. Filed Feb. 5, 1960, Ser. No. 6,849
Claims priority, application Mexico Feb. 7, 1959
20 Claims. (Cl. 260—397.3)

The present invention relates to novel cyclopentanophenanthrene compounds and process of preparing same.

More particularly the invention relates to novel 1-cyano derivatives of $\Delta^4$-3-keto steroids of the androstane series which may or may not be oxygenated at C–11.

The novel compounds of the present invention can be represented by the following formula:

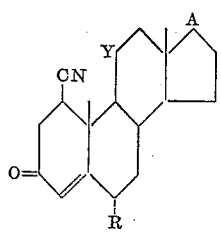

In the above formula Y represents hydrogen, keto and β-hydroxy; A represents keto,

in which R' represents hydrogen or a hydrocarbon carboxylic acyl group containing from 1 to 12 carbon atoms; $R^2$ represents hydrogen or lower alkyl containing 1 to 5 carbon atoms and R represents hydrogen, methyl or fluoro. The acyl group may be saturated or unsaturated, straight chain or branched chain aliphatic, cyclic or mixed cyclic aliphatic and may be substituted as by hydroxy, acyloxy containing 1 to 12 carbon atoms, alkoxy containing 1 to 5 carbon atoms, or halogen such as fluorine, chlorine, bromine. Typical acyl groups of this type are the acetate, propionate, butyrate, hemisuccinate, enanthate, caproate, benzoate, trimethylacetate, phenoxyacetate, phenylpropionate, cyclopentylpropionate and β-chloropropionate.

The novel compounds of the present invention are valuable hormones of the androgenic type having a favorable anabolic-androgenic ratio and anti-estrogenic activity. The 17α-alkynyl derivatives particularly exhibit progestational as well as anti-estrogenic activity.

The novel 1-cyano compounds of the androstane series are prepared from the corresponding 1-dehydro androstene compound. Since the cyanization step causes almost complete hydrolysis of esterified groups, it is preferred that any hydroxy groups present in the starting material be in the free form. The elements of hydrogen cyanide are added to the starting 1-dehydro compounds by refluxing the latter with an alkali metal cyanide such as potassium cyanide or an alkaline earth metal cyanide in an alcoholic solvent, preferably ethanol or methanol. The thus formed 1-cyano compounds may then be esterified, if desired, by conventional methods. Thus by conventional reaction with the corresponding acid anhydride or acyl chloride in pyridine solution at room temperature there is prepared the corresponding C–17 esters of those products having a secondary alcohol group at C–17 and by reaction with acid anhydride in the presence of an acid catalyst such as p-toluene-sulphonic acid, there is prepared the corresponding esters of those products having a tertiary alcohol group at C–17.

This invention is further illustrated but not limited by the following examples:

EXAMPLE 1

A mixture of 1 g. of 1-dehydro-testosterone, 2 g. of potassium cyanide and 50 cc. of 95% ethanol was refluxed for 1 hour, cooled, diluted with water and the reaction product was extracted with ethyl acetate. The extract was washed with water, dried over anhydrous sodium sulfate and the solvent was evaporated. By chromatography of the residue on neutral alumina, there was obtained 1-cyano-testosterone.

A mixture of 500 mg. of the above compound, 5 cc. of pyridine and 1 cc. of acetic anhydride was kept at room temperature for 4 hours and poured into water; the precipitate was collected by filtration, washed with water, dried and recrystallized from acetone-hexane, thus affording 1-cyano-testosterone acetate.

EXAMPLE 2

In accordance with the method of the previous example, 1 g. of 17α-methyl-1-dehydro-testosterone described in U.S. Patent 2,864,831, was converted into 17α-methyl-1-cyano-testosterone.

A mixture of 500 mg. of the above compound, 2.5 cc. of acetic anhydride, 25 cc. of glacial acetic acid and 500 mg. of p-toluenesulfonic acid was kept overnight at room temperature, diluted with water and extracted several times with ethyl acetate. The extract was washed with 5% aqueous sodium bicarbonate solution and water, dried over anhydrous sodium sulfate and evaporated to dryness. Recrystallization of the residue from acetone yielded 17α-methyl-1-cyano-testosterone 17-acetate.

EXAMPLE 3

By refluxing 1 g. of 17α-ethynyl-1-dehydro-testosterone, described by Sondheimer et al. in JACS 77, 5673 (1955), with potassium cyanide in ethanol, in accordance with the procedure described in Example 1, there was obtained 17α-ethynyl-1-cyano-testosterone.

A mixture of 500 mg. of the above compound, 20 cc. of benzene, 1 g. of cyclopentylpropionic acid anhydride and 200 mg. of p-toluenesulfonic acid was kept at room temperature for 48 hours, diluted with water, heated for half an hour on the steam bath, cooled and extracted with methylene chloride. The extract was washed with aqueous sodium bicarbonate solution and water, dried over anhydrous sodium sulfate and evaporated to dryness. By chromatography of the residue on neutral alumina there was obtained 17α-ethynyl-1-cyano-testosterone 17-cyclopentylpropionate.

EXAMPLE 4

In accordance with the method described in Example 1, $\Delta^{1,4}$-androstadien-3,17-dione was converted into 1-cyano-$\Delta^4$-androsten-3,17-dione.

EXAMPLE 5

In accordance with the method described in Example 1, 11-keto-1-dehydro-testosterone was converted into 1-cyano-11-keto-testosterone. 500 mg. of the latter was treated with 5 cc. of pyridine and 1 cc. of propionic anhydride and kept overnight at room temperature. The product was isolated as described in Example 1 for the acetylation of 1-cyano-testosterone, thus affording 1-cyano-11-keto-testosterone propionate.

The starting material was obtained by the following method of preparation: a mixture of 5 g. of 11-keto-testosterone, 2.15 g. of selenium dioxide, 250 cc. of t-butanol and 0.6 cc. of pyridine was refluxed for 96 hours under an atmosphere of nitrogen and the mixture was filtered through celite. The precipitate was washed with 600 cc. of hot ethyl acetate and the combined filtrate and washings was concentrated to dryness under vacuo, avoiding overheating. The residue was dissolved in 600 cc. of acetone, mixed with 5 g. of charcoal, refluxed for half an hour, filtered and concentrated to a small volume. Upon cooling the crystalline 11-keto-1-dehydro-testosterone was obtained.

Following the procedure of Example 1, the final products listed in Table I below, under III are obtained from the starting materials listed under II, which in turn were obtained from the known compounds listed under I by the method of preparation described in Example 5.

Table I

| Ex. No. | I | II | III |
|---|---|---|---|
| 6 | 17α-ethyl-testosterone. | 1-dehydro-17α-ethyl-testosterone. | 1-cyano-17α-ethyl-testosterone. |
| 7 | 17α-propyl-testosterone. | 1-dehydro-17α-propyl-testosterone. | 1-cyano-17α-propyl-testosterone. |
| 8 | 17α-vinyl-testosterone. | 1-dehydro-17α-vinyl-testosterone. | 1-cyano-17α-vinyl-testosterone. |
| 9 | 17α-propin(1)yl-testosterone J. Pharm. Pharmacol. 1957 Vol. 9, p. 929. | 1-dehydro-17α-propin(1)yl-testosterone. | 1-cyano-17α-propin(1)yl-testosterone. |
| 10 | 17α-methyl-6α-fluoro-testosterone. | 1-dehydro-17α-methyl-6α-fluoro-testosterone. | 1-cyano-17α-methyl-6α-fluoro-testosterone. |
| 11 | 17α-ethynyl-6α-fluoro-testosterone. | 1-dehydro-17α-ethynyl-6α-fluoro-testosterone. | 1-cyano-17α-ethynyl-6α-fluoro-testosterone. |
| 12 | 17α-ethynyl-6α-methyl-testosterone. | 1-dehydro-17α-ethynyl-6α-methyl-testosterone. | 1-cyano-17α-ethynyl-6α-methyl-testosterone. |
| 13 | 6α-fluoro-testosterone. | 1-dehydro-6α-fluoro-testosterone. | 1-cyano-6α-fluoro-testosterone. |
| 14 | 6α-methyl-testosterone. | 1-dehydro-6α-methyl-testosterone. | 1-cyano-6α-methyl-testosterone. |

EXAMPLE 15

In accordance with the method described in Example 1, 1-dehydro-17α-propen-(1)-yl-testosterone was converted into 1-cyano-17α-propen-(1)-yl-testosterone. The starting material was obtained from 17α-propin-(1)-yl-1-dehydro-testosterone by partial hydrogenation of the triple bond by the method described by Sandoval et al. in JACS 77, 148 (1955).

EXAMPLE 16

In accordance with the procedure of Example 1, 1-dehydro-17α-butin-(1)-yl-testosterone, obtained from dehydroepiandrosterone with the aid of butine-(1) instead of acetylene by the method described by Ruzicka et al. in Helv. Chim. Acta. 20, 1280 (1937), followed by the dehydrogenation method described in Example 5, was converted into 1-cyano-17α-butyn-(1)-yl-testosterone.

EXAMPLE 17

In accordance with the method described in Example 1, 1-dehydro-17α-buten-(1)-yl-testosterone was converted into 1-cyano-17α-buten-(1)-yl-testosterone. The starting material was obtained from 1-dehydro-17α-butin-(1)-yl-testosterone by selective partial hydrogenation of the triple bond by the method described by Sandoval et al. in JACS 77, 148 (1955).

EXAMPLE 18

In accordance with the method of Example 1, 1-dehydro-11β-hydroxy-17α-methyl-testosterone, described in U.S. Patent 2,864,832, was converted into 1-cyano-11β-hydroxy-17α-methyl-testosterone.

EXAMPLE 19

By applying the method of Example 1, 1-dehydro-11-keto-17α-ethinyl-testosterone, described by L. Velluz et al. in J. Am. Chem. Soc., 80, 2026, (1958), was converted into 1-cyano-11-keto-17α-ethinyl-testosterone.

A mixture of 500 mg. of the above compound, 50 cc. of benzene, 1 cc. of propionic anhydride and 200 mg. of p-toluenesulfonic acid was kept at room temperature for 48 hours. It was then diluted with water and extracted with methylene chloride. The extract was washed with 5% sodium carbonate solution, dried over anhydrous sodium sulfate and evaporated to dryness. By chromatography of the residue on neutral alumina there was obtained 17α-ethinyl-1-cyano-11-keto-testosterone 17-propionate.

EXAMPLE 20

In accordance with the method described in Example 1, Δ$^{1,4}$-androstadien-3,11,17-trione, described by H. L. Herzog et al. in J. Am. Chem. Soc. 77, 4781 (1955), was converted into 1-cyano-Δ$^4$-androsten 3,11,17-trione, i.e. 1-cyano-adrenosterone.

We claim:

1. 1β-cyano derivatives of Δ$^4$-3-keto steroids of the androstane series.

2. A compound of the following formula:

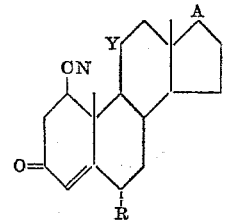

in which Y is selected from the group consisting of

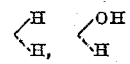

and keto; R is selected from the group consisting of hydrogen, methyl and fluoro; A is selected from the group consisting of keto,

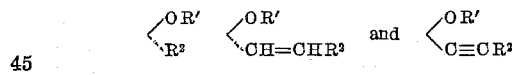

wherein R' is selected from the group consisting of hydrogen and a hydrocarbon carboxylic acyl group of less than 12 carbon atoms and R$^2$ is selected from the group consisting of hydrogen and lower alkyl.

3. 1β-cyano-testosterone.
4. 1β-cyano-6α-methyl-testosterone.
5. 1β-cyano-11-keto-testosterone.
6. 1β-cyano-Δ$^4$-androsten-3,11,17-trione.
7. 1β-cyano-Δ$^4$-androsten-3,17-dione.
8. The hydrocarbon carboxylic acid esters of less than 12 carbon atoms of 1β-cyano-testosterone.
9. 1β-cyano-testosterone acetate.
10. 1β-cyano-17α-lower alkyl-testosterone.
11. 1β-cyano-17α-methyl-testosterone.
12. 1β-cyano-6α-fluoro-17α-methyl-testosterone.
13. 1β-cyano-11β-hydroxy-17α-methyl-testosterone.
14. The hydrocarbon carboxylic acid esters of less than 12 carbon atoms of 1β-cyano-17α-lower alkyl testosterone.
15. 1β-cyano-17α-lower alkenyl-testosterone.
16. 1β-cyano-17α-lower alkynyl-testosterone.
17. 1β-cyano-17α-ethynyl-testosterone.
18. 1β-cyano-6α-methyl-17α-ethynyl-testosterone.
19. The hydrocarbon carboxylic acid ester of less than 12 carbon atoms of 1β-cyano-17α-lower alkynyl-testosterone.
20. 1β-cyano-17α-ethynyl-testosterone cyclopentylpropionate No references cited.